US010586214B2

(12) United States Patent
Gupta et al.

(10) Patent No.: US 10,586,214 B2
(45) Date of Patent: Mar. 10, 2020

(54) SYSTEMS AND METHODS FOR ELECTRONIC TRANSMISSION AND CONFIRMATION OF AN ONLINE ORDER

(71) Applicant: Walmart Apollo, LLC, Bentonville, AR (US)

(72) Inventors: Anurag Gupta, Palo Alto, CA (US); Sridhar Kandimalla, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 205 days.

(21) Appl. No.: 15/379,618

(22) Filed: Dec. 15, 2016

(65) Prior Publication Data

US 2018/0174109 A1 Jun. 21, 2018

(51) Int. Cl.
*G06Q 10/10* (2012.01)
*G06Q 10/08* (2012.01)
*G06Q 30/06* (2012.01)

(52) U.S. Cl.
CPC ....... *G06Q 10/1095* (2013.01); *G06Q 10/087* (2013.01); *G06Q 30/0633* (2013.01)

(58) Field of Classification Search
CPC ............. G06Q 10/1095; G06Q 10/087; G06Q 30/0633
USPC ......................................................... 705/7.19
See application file for complete search history.

(56) References Cited

U.S. PATENT DOCUMENTS

| | | | | |
|---|---|---|---|---|
| 7,590,567 | B2 | 9/2009 | Hopson et al. | |
| 2002/0077973 | A1* | 6/2002 | Ronchi .................. | G06Q 20/10 705/39 |
| 2004/0068443 | A1* | 4/2004 | Hopson .................. | G06Q 10/02 705/5 |
| 2009/0228325 | A1 | 9/2009 | Simmons et al. | |

(Continued)

OTHER PUBLICATIONS

Wal-Mart expands online grocery pickup in NWA. Hosticka, Alexis. Arkansas Business 32.38: 6(1). Journal Publishing, Inc. (Sep. 21, 2015).*

*Primary Examiner* — Timothy Padot
(74) *Attorney, Agent, or Firm* — Bryan Cave Leighton Paisner LLP

(57) ABSTRACT

In some embodiments, a method can comprise facilitating display on an electronic display of one or more available time slots available at a store to a user. In many embodiments, the method can further comprise receiving a selection over an electronic transmission system of a first time slot from the user, the one or more available time slots comprising the first time slot and receiving, in an electronic order cart, a selection of a plurality of items from the user. In some embodiments, the method can further comprise, after receiving the selection of the plurality of items from the user, determining that the plurality of items are available in a store inventory of the store. In many embodiments, the method can comprise, in response to determining that the plurality of items are available in the store inventory, determining that one or more pickers are available to finish picking the plurality of items before the first time slot and, after determining that the one or more pickers are available to pick the plurality of items, confirming the first time slot with the user. Other embodiments of related methods and systems are also provided.

20 Claims, 6 Drawing Sheets

(56) References Cited

U.S. PATENT DOCUMENTS

2011/0295413 A1* 12/2011 Hara .................... G06Q 10/087
700/216
2014/0052498 A1* 2/2014 Marshall ............ G06Q 30/0635
705/7.35
2014/0279238 A1 9/2014 Jones et al.
2015/0100433 A1 4/2015 Choy et al.
2015/0310536 A1* 10/2015 Brady ................ G06Q 30/0635
705/26.5

* cited by examiner

Universal Serial Bus
112
CD-Rom Drive
116
Hard Drive
114
Graphics Adapter
224
Disk Controller
204
Memory ROM/RAM
208
Network Adapter
220
214
System Bus
Other I/O Devices
222
Mouse Adapter
206
Mouse
110
Keyboard Adapter
226
Keyboard
104
CPU
210
Video Controller
202
Monitor
106

Figure 5:
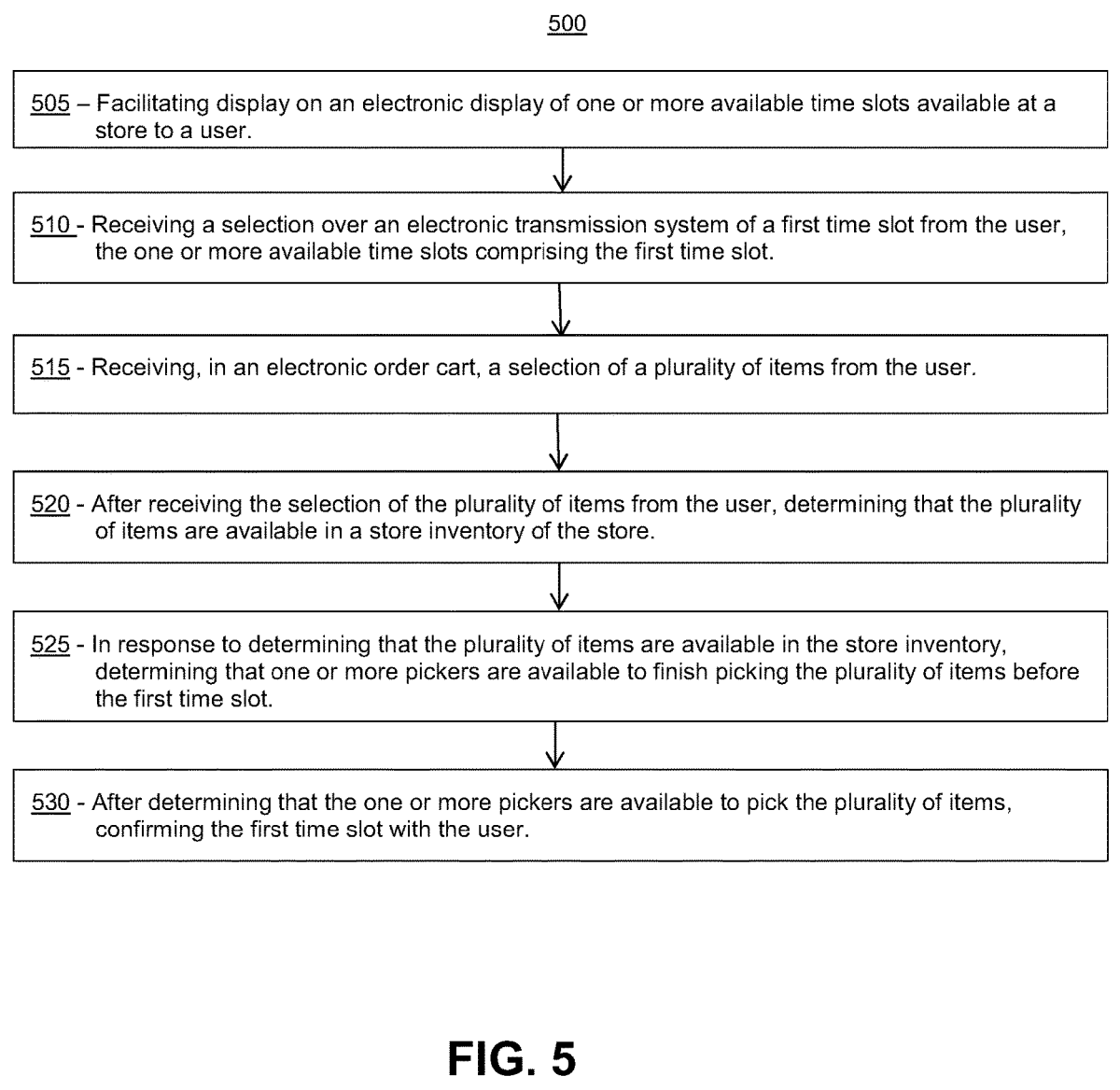

500

505 – Facilitating display on an electronic display of one or more available time slots available at a store to a user.

510 - Receiving a selection over an electronic transmission system of a first time slot from the user, the one or more available time slots comprising the first time slot.

515 - Receiving, in an electronic order cart, a selection of a plurality of items from the user.

520 - After receiving the selection of the plurality of items from the user, determining that the plurality of items are available in a store inventory of the store.

525 - In response to determining that the plurality of items are available in the store inventory, determining that one or more pickers are available to finish picking the plurality of items before the first time slot.

530 - After determining that the one or more pickers are available to pick the plurality of items, confirming the first time slot with the user.

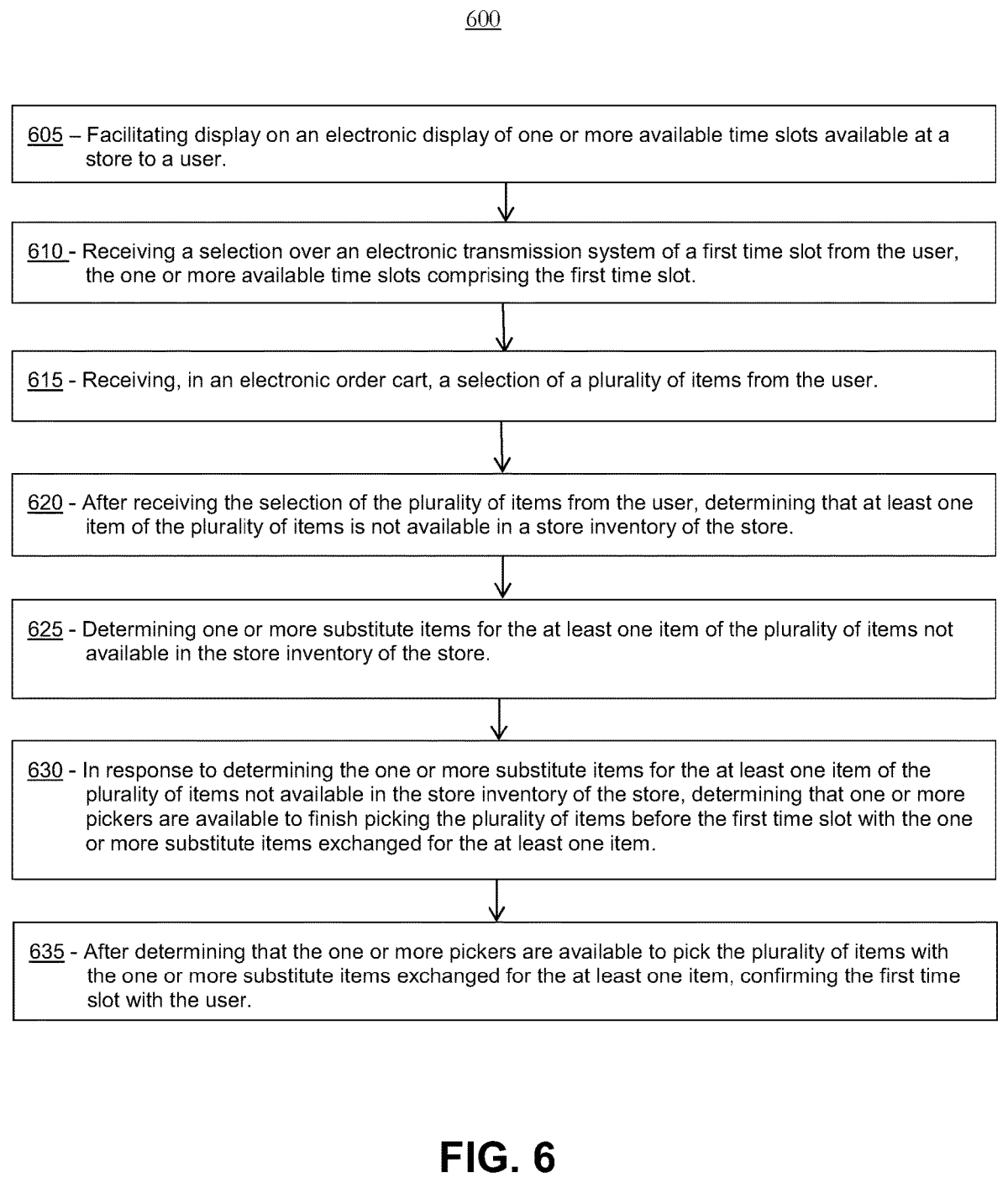

605 – Facilitating display on an electronic display of one or more available time slots available at a store to a user.

610 - Receiving a selection over an electronic transmission system of a first time slot from the user, the one or more available time slots comprising the first time slot.

615 - Receiving, in an electronic order cart, a selection of a plurality of items from the user.

620 - After receiving the selection of the plurality of items from the user, determining that at least one item of the plurality of items is not available in a store inventory of the store.

625 - Determining one or more substitute items for the at least one item of the plurality of items not available in the store inventory of the store.

630 - In response to determining the one or more substitute items for the at least one item of the plurality of items not available in the store inventory of the store, determining that one or more pickers are available to finish picking the plurality of items before the first time slot with the one or more substitute items exchanged for the at least one item.

635 - After determining that the one or more pickers are available to pick the plurality of items with the one or more substitute items exchanged for the at least one item, confirming the first time slot with the user.

FIG. 6

SYSTEMS AND METHODS FOR ELECTRONIC TRANSMISSION AND CONFIRMATION OF AN ONLINE ORDER

TECHNICAL FIELD

This disclosure relates generally to systems for electronic transmission and confirmation of an online order, and related methods.

BACKGROUND

When scheduling a time for order pick up, it can be difficult for a system to provide and confirm accurate time slots that are available for a user or customer to pick up an order. Many times, it can be time consuming for a system to verify a pick up time slot availability and an availability of a picker to pull the items for an order before an order pick up time can be confirmed. In addition, some items have multiple attributes that can vary. The ability to efficiently search an inventory system for item availability and efficiently verify picker availability can allow for more accurate order pick up times. Accordingly, there is a need for systems and methods to provide for electronic transmission and confirmation of an online order.

BRIEF DESCRIPTION OF THE DRAWINGS

To facilitate further description of the embodiments, the following drawings are provided in which:

FIG. 5 illustrates is a flowchart for a method, according to an embodiment; and FIG. 6 illustrates a flowchart for another method, according to another embodiment.

Figure 1:
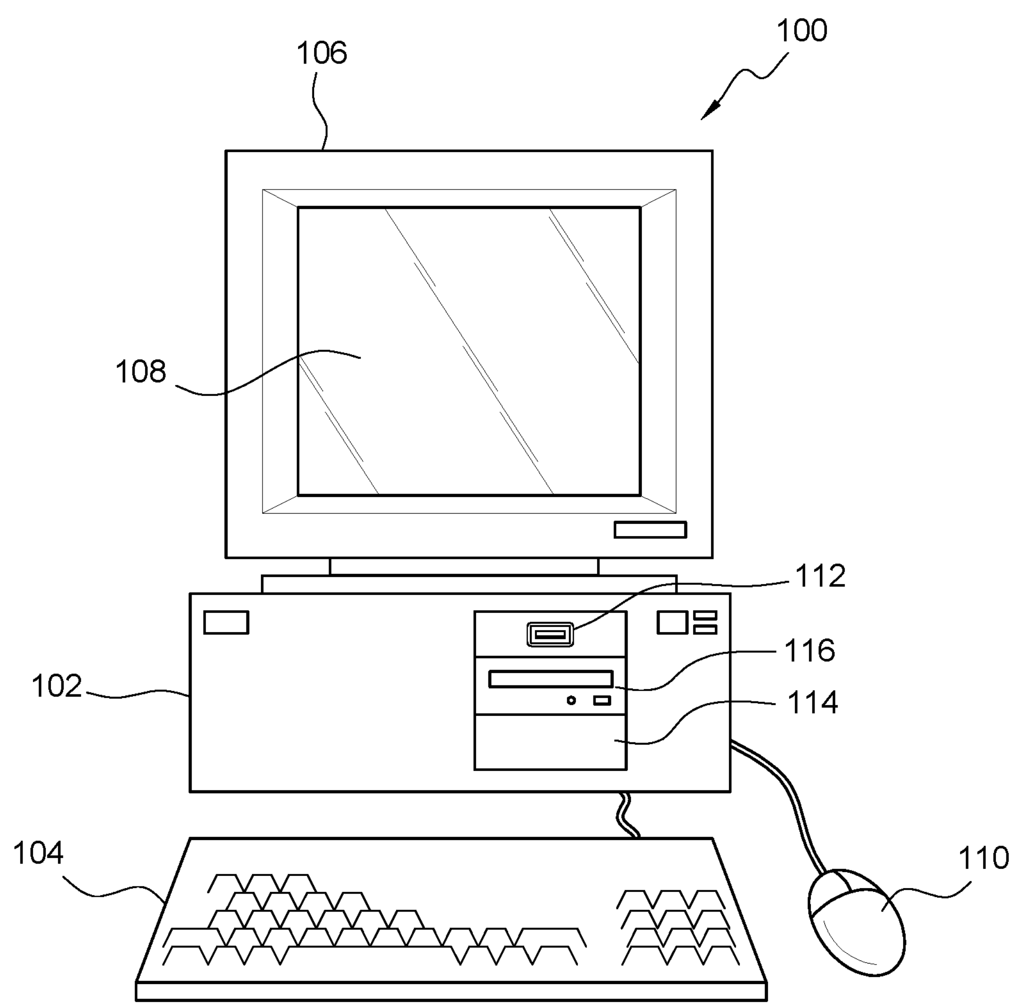
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments can include a system. In many embodiments, the system can comprise one or more processing modules and one or more non-transitory storage modules storing computing instructions configured to run on the one or more processing modules and perform acts. In many embodiments, the acts can comprise facilitating display on an electronic display of one or more available time slots available at a store to a user, receiving a selection over an electronic transmission system of a first time slot from the user, the one or more available time slots comprising the first time slot, and receiving, in an electronic order cart, a selection of a plurality of items from the user. In some embodiments, the acts can further comprise, after receiving the selection of the plurality of items from the user, determining that the plurality of items are available in a store inventory of the store and, in response to determining that the plurality of items are available in the store inventory, determining that one or more pickers are available to finish picking the plurality of items before the first time slot. In many embodiments, the acts can further comprise, after determining that the one or more pickers are available to pick the plurality of items, confirming the first time slot with the user.

In some embodiments, a method can comprise facilitating display on an electronic display of one or more available time slots available at a store to a user. In many embodiments, the method can further comprise receiving a selection over an electronic transmission system of a first time slot from the user, the one or more available time slots comprising the first time slot and receiving, in an electronic order cart, a selection of a plurality of items from the user. In some embodiments, the method can further comprise, after receiving the selection of the plurality of items from the user, determining that the plurality of items are available in a store inventory of the store. In many embodiments, the method can comprise, in response to determining that the plurality of items are available in the store inventory, determining that one or more pickers are available to finish picking the plurality of items before the first time slot and, after determining that the one or more pickers are available to pick the plurality of items, confirming the first time slot with the user.

Various embodiments can include a method. In many embodiments, the method can comprise facilitating display on an electronic display of one or more available time slots available at a store to a user, receiving a selection over an electronic transmission system of a first time slot from the user, the one or more available time slots comprising the first time slot, and receiving, in an electronic order cart, a selection of a plurality of items from the user. In some embodiments, the method can further comprise, after receiving the selection of the plurality of items from the user, determining that at least one item of the plurality of items is not available in a store inventory of the store and determining one or more substitute items for the at least one item of the plurality of items not available in the store inventory of the store. In a number of embodiments, the method can further comprise, in response to determining the one or more substitute items for the at least one item of the plurality of items not available in the store inventory of the store, determining that one or more pickers are available to finish picking the plurality of items before the first time slot with the one or more substitute items exchanged for the at least one item and, after determining that the one or more pickers are available to pick the plurality of items with the one or more substitute items exchanged for the at least one item, confirming the first time slot with the user.

Figure 2:
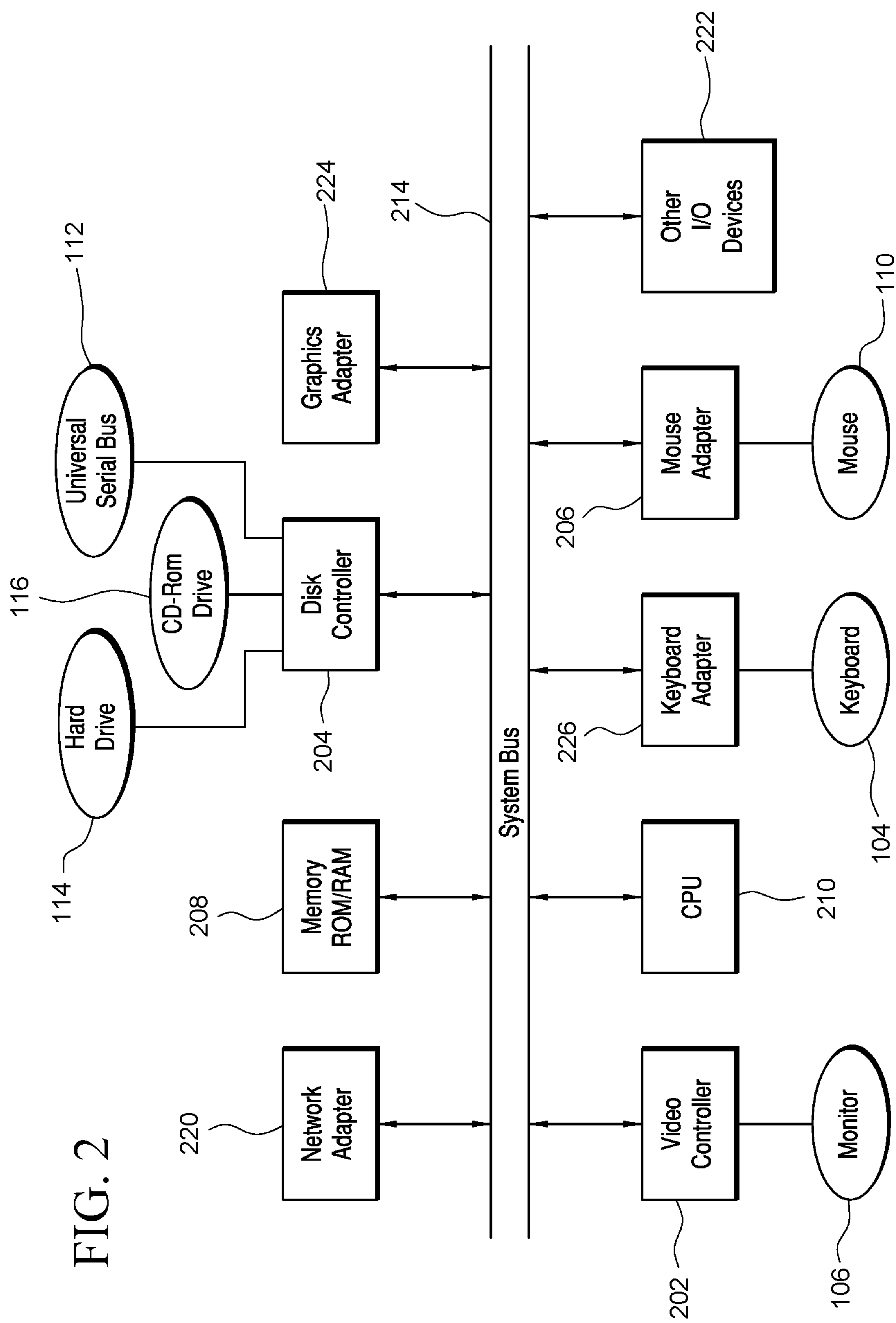
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with a CD-ROM and/or DVD drive 116 (FIGS. 1-2), floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
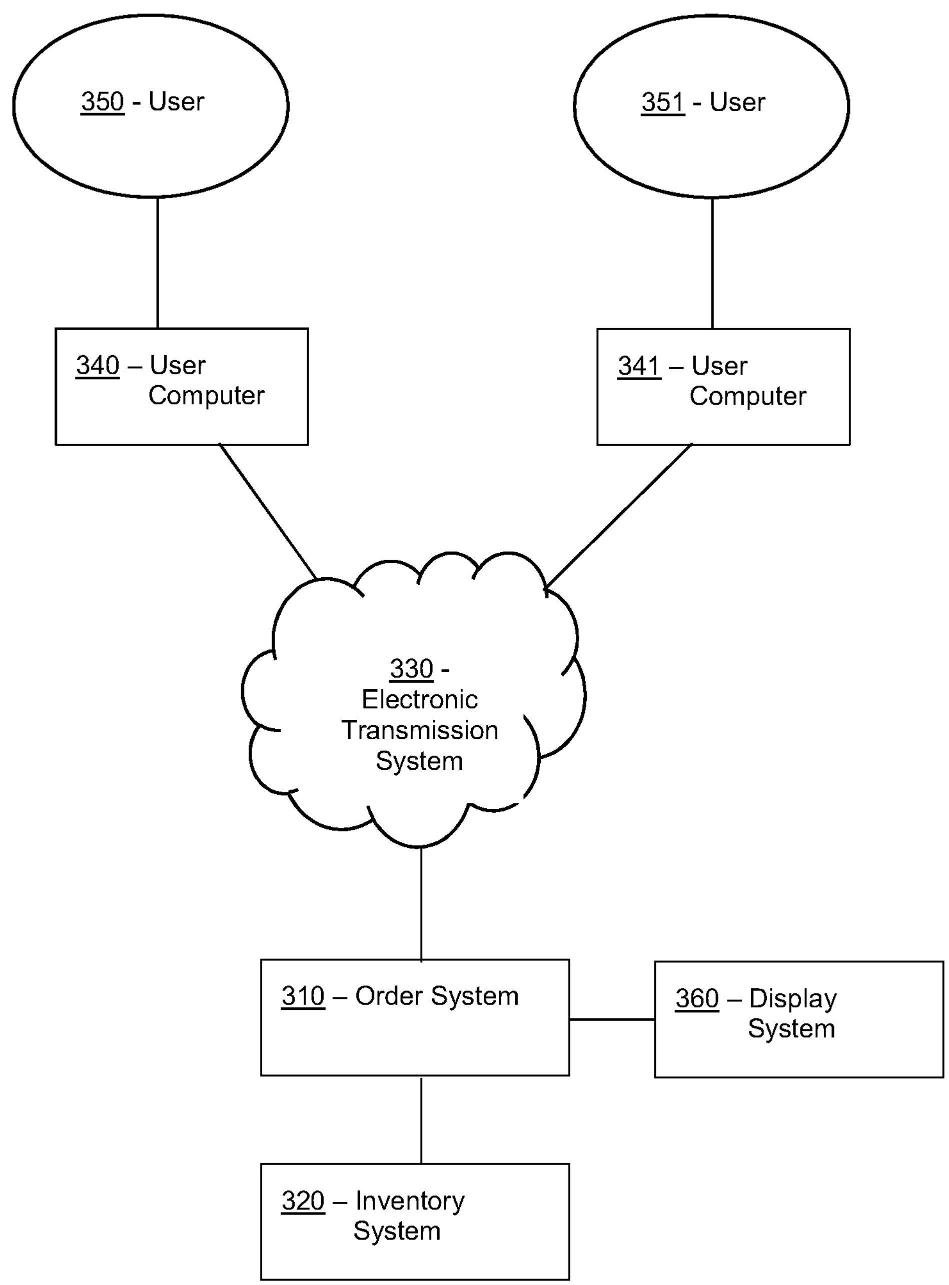
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, system 300 can comprise an order system 310, an inventory system 320, and a display system 360. In some embodiments, order system 310, inventory system 320, and display system 360 can each be a computer system 100 (FIG. 1), as described above, and can each be a single computer, a single server, or a cluster or collection of computers or servers. In some embodiments, inventory system 320 can be in communication with an inventory database (not shown) which can track distinct items (e.g., stock keeping units (SKUs)) in a product catalog, which can be ordered through the online retailer and which can be housed at one or more warehouses. In many embodiments, warehouses can comprise brick-and-mortar stores, distribution centers, and/or other storage facilities.

In many embodiments, order system 310, inventory system 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of order system 310, inventory system 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of order system 310, inventory system 320, and/or display system 360. In a similar manner, the processing module(s) and the memory storage module(s) can be local and/or remote to each other.

In many embodiments, order system 310 and/or display system 360 can be configured to communicate with one or more customer computers 340 and 341. In some embodiments, customer computers 340 and 341 also can be referred to as user computers. In some embodiments, order system

310 and/or display system 360 can communicate or interface (e.g. interact) with one or more customer computers (such as customer computers 340 and 341) through an electronic transmission system 330.

In some embodiments, electronic transmission system 330 can be an electronic transmission system network, an internet, an intranet that is not open to the public, an email system, and/or a texting system. In many embodiments, electronic transmission system 330 can comprise one or more electronic transmission channels. In many embodiments, the electronic transmission channels can comprise an email, a text message, and/or an electronic notice or message. Accordingly, in many embodiments, order system 310 and/or display system 360 (and/or the software used by such systems) can refer to a back end of system 300 operated by an operator and/or administrator of system 300, and customer computers 340 and 341 (and/or the software used by such systems) can refer to a front end of system 300 used by one or more customers 350 and 351, respectively. In some embodiments, customers 350 and 351 also can be referred to as users, in which case, customer computers 340 and 341 can be referred to as user computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, order system 310, inventory system 320, and/or display system 360 also can be configured to communicate with one or more databases. The one or more database can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between order system 310, inventory system 320, display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 4:
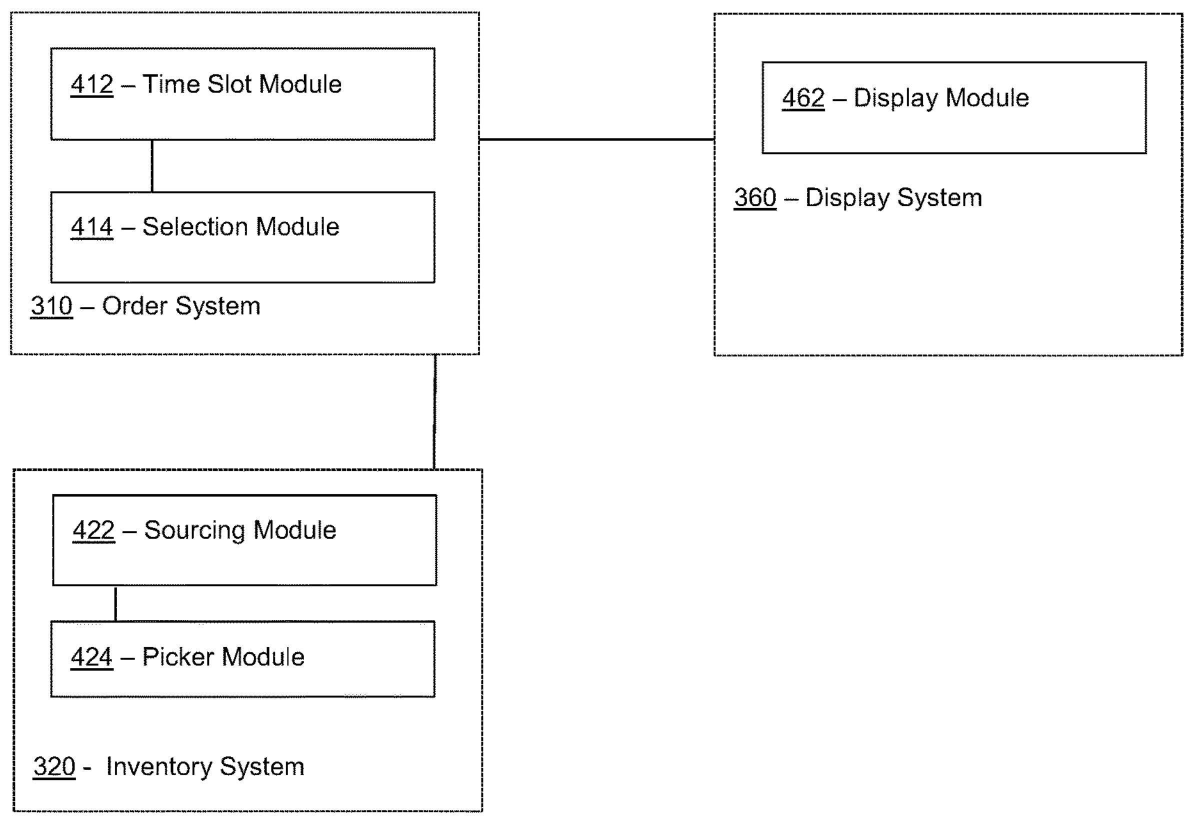
FIG. 4 illustrates a representative block diagram of a portion of the system of FIG. 3, according to an embodiment.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules 412, 414, 422, 424, and/or 462 (FIG. 4). Such non-transitory memory storage modules can be part of a computer system such as order system 310 (FIGS. 3 & 4), inventory system 320 (FIGS. 3 & 4), and/or display system 360 (FIGS. 3 & 4). The processing module(s) can be similar or identical to the processing module(s) described above with respect to computer system 100 (FIG. 1).

In many embodiments, method 500 can comprise an activity 505 of facilitating a display on an electronic display of one or more available product pick-up time slots available at a store to a user. In some embodiments, activity 505 of facilitating the display on the electronic display of the one or more available time slots can comprise facilitating the display on the electronic display of a calendar with one or more open time slots for at least two days. In some embodiments, activity 505 of facilitating the display on the electronic display of the one or more available time slots can comprise facilitating the display on the electronic display of a calendar with one or more open time slots for at least one to five days. In some embodiments, activity 505 of facilitating the display on the electronic display of the one or more available time slots can comprise facilitating the display on the electronic display of a calendar with one or more open time slots for a recurring time on a recurring date each week or month. In various embodiments, the store can comprises a closest store to a location of the user. In some embodiments, the location of the user can be based at least in part on the location services of a mobile device of the user or on the location identified in the user's profile. In some embodiments, the store can comprise a selected store selected by the user.

In many embodiments, method 500 can further comprise an activity 510 of receiving a selection over an electronic transmission system of a first time slot from the user (e.g. user 350 or 351 (FIG. 3)), the one or more available time slots comprising the first time slot. In some embodiments, an earliest time slot of the one or more available time slots can be at least approximately 30 minutes after the one or more available time slots are displayed to the user (e.g. user 350 or 351 (FIG. 3)). In some embodiments, an earliest time slot of the one or more available time slots can be at least approximately 10 minutes to approximately 60 minutes after the one or more available time slots are displayed to the user (e.g. user 350 or 351 (FIG. 3)). In many embodiments, receiving a selection of a first time slot from the user (e.g. user 350 or 351 (FIG. 3)) can create a tentative booking in the system (e.g., order system 310 (FIG. 3)). In various embodiments, the electronic transmission channel can be an internet, an intranet, a text, or an email.

In some embodiments, method 500 can further comprise an activity 515 of receiving, in an electronic order cart, a selection of a plurality of items from the user (e.g. user 350 or 351 (FIG. 3)). In many embodiments, activity 515 of receiving the selection of the plurality of items from the user (e.g. user 350 or 351 (FIG. 3)) can comprise prefilling the electronic order cart with a previous order of the user (e.g. user 350 or 351 (FIG. 3)) and/or a list of prefill items saved in a user's profile. In a number of embodiments, the electronic order cart can be prefilled using item prediction. In some embodiments, item prediction can be based at least in part on common or popular items (e.g., milk, eggs, bread). In many embodiments, item prediction can be based at least in part on sale items and/or holiday or seasonal items. In some embodiments, inventory system 320 (FIG. 3) can communicate one or more sale items based at least in part on advertisements to order system 310 (FIG. 3) for prefilling the electronic order cart.

In various embodiments, method 500 can further comprise an activity 520 of after receiving the selection of the plurality of items from the user, determining that the plurality of items are available in a store inventory of the store. In many embodiments, activity 520 of after receiving the selection of the plurality of items from the user, determining that the plurality of items are available in a store inventory of the store can comprise the order system (e.g., order system 310 (FIG. 3)) communicating with the inventory system (e.g., inventory system 320 (FIG. 3)) to verify availability of all or a portion of the plurality of items during a same network verification roundtrip, wherein the portion of the plurality of items comprises at least 10 percent, 20 percent, 30 percent, 40, percent, or 50 percent of the number of items of the plurality of items. In many embodiments, activity 520 of after receiving the selection of the plurality of items from the user, determining that the plurality of items are available in a store inventory of the store does not comprise the order system (e.g., order system 310 (FIG. 3)) communicating with the inventory system (e.g., inventory system 320 (FIG. 3)) to verify availability of only one item of the plurality of items during a single network verification roundtrip. The reasons for this exclusion in these embodiments is explained below.

One or more advantages of an activity 520 of, after receiving the selection of the plurality of items from the user, determining that the plurality of items are available in a store inventory of the store can comprise requiring fewer network roundtrips (e.g., one per order rather than one per item), which can result in more efficient processing and use of network resources. In many embodiments, one or more advantages of activity 520 of after receiving the selection of the plurality of items from the user, determining that the plurality of items are available in a store inventory of the store can comprise locking inventory items for a short time when checking for an entire order of the plurality of items or a percentage of the plurality of items. Locking inventory items for a short time when checking for the entire order of the plurality of items or the percentage of the plurality of items can be advantageous because when checking inventory on a per item basis, it is possible for the user (e.g. user 350 or 351 (FIG. 3)) to reserve an item of the plurality of items so it is unavailable to other users, and then the user (e.g. user 350 or 351 (FIG. 3)) may decide to stop short of checking out. During this time, the item of the plurality of items can sit unused in the inventory while legitimate demand for it from other users can go unfulfilled. In many embodiments, one or more advantages of activity 520 of after receiving the selection of the plurality of items from the user, determining that the plurality of items are available in a store inventory of the store can comprise better system (e.g., system 100 (FIG. 1)) availability. In many embodiments, better system availability can comprise allowing a service or system (e.g., inventory system 320 (FIG. 3)) to go down (e.g., sleep or offline) while the user (e.g. user 350 or 351 (FIG. 3)) creates an order, and lack of that service or system (e.g., inventory system 320 (FIG. 3)) can have little impact on the user (e.g. user 350 or 351 (FIG. 3)) creating the order. This process is advantageous because, in a system that requires inventory verification on a per item basis, the service or system (e.g., inventory system 320 (FIG. 3)) would need to be up or available for each and every item that is added to the electronic order cart.

In a number of embodiments, method 500 can further comprise an activity 525 of, in response to determining that the plurality of items are available in the store inventory, determining that one or more pickers are available to finish picking the plurality of items before the first time slot. In some embodiments, a selection of inventory items can be available in a pre-staging area for the one or more pickers. In some embodiments, the selection of inventory items available in the pre-staging area can comprise common, popular, and/or sale items. In some embodiments, the selection of inventory items available in the pre-staging area can comprise at least a portion of the items that the order system (e.g., order system 310 (FIG. 3)) prefills the electronic order cart with when using item prediction. In some embodiments, the at least one picker of the one or more pickers can be assigned a section of the store (e.g., the frozen food section or the produce section).

In many embodiments, method 500 can further comprise an activity 530 of, after determining that the one or more pickers are available to pick the plurality of items, confirming the first time slot with the user. In some embodiments, confirming the first time slot with the user can comprise confirming the time slot with the user through one or more electronic transmission channels (e.g., electronic transmission channel of electronic transmission system 330 (FIG. 3)).

In different embodiments, method 500 can omit activities 505 and 510 at the beginning of method 500, and instead, perform activities 505 and 510 only after activities 515, 520, and 525. In these different embodiments, the time slots presented to the user for selection in activity 505 can be based on all of the user's selections of the plurality of items being available and further can be based on the picker(s) being available to pick the selections before the product pick-up time slots. In a variation of these different embodiments, the user can be presented with optional earlier time slots if the user is willing to remove one or more items from her electronic order cart because waiting for those one or more items to become available in inventory and/or to be able to picked by a picker will delay the product pick-up time slots. In these different embodiments, activity 530 optionally can be omitted, as well.

In some embodiments, method 500 can further comprise an activity of assigning at least portion of the plurality of items to a first picker of the one or more pickers. In a number of embodiments, method 500 can further comprise an activity of assigning a remainder of the plurality of items to a second picker of the one or more items.

FIG. 6 illustrates a flow chart for a method 600, according to an embodiment. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, system 300 (FIG. 3) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules 412, 414, 422, 424, and/or 462 (FIG. 4). Such non-transitory memory storage modules can be part of a computer system such as order system 310 (FIGS. 3 & 4), inventory system 320 (FIGS. 3 & 4), and/or display system 360 (FIGS. 3 & 4). The processing module(s) can be similar or identical to the processing module(s) described above with respect to computer system 100 (FIG. 1). In many embodiments, method 600 can be similar to method 500 (FIG. 5).

In many embodiments, method 600 can comprise an activity 605 of facilitating a display on an electronic display of one or more available product pick-up time slots available at a store to a user. In some embodiments, activity 605 of facilitating display on an electronic display of one or more available time slots available at a store to a user can be similar to activity 505 (FIG. 5) of facilitating display on an electronic display of one or more available time slots available at a store to a user.

In many embodiments, method 600 can further comprise an activity 610 of receiving a selection over an electronic transmission system of a first time slot from the user (e.g. user 350 or 351 (FIG. 3)), the one or more available time slots comprising the first time slot. In some embodiments, activity 610 of receiving a selection over an electronic transmission system of a first time slot from the user (e.g. user 350 or 351 (FIG. 3)), the one or more available time slots comprising the first time slot, can be similar to activity 510 (FIG. 5) of receiving a selection over an electronic transmission system of a first time slot from the user (e.g. user 350 or 351 (FIG. 3)), the one or more available time slots comprising the first time slot.

In some embodiments, method 600 can further comprise an activity 615 of receiving, in an electronic order cart, a selection of a plurality of items from the user (e.g. user 350 or 351 (FIG. 3)). In a number of embodiments, activity 615 of receiving, in an electronic order cart, a selection of a plurality of items from the user (e.g. user 350 or 351 (FIG. 3)) can be similar to activity 515 (FIG. 5) of receiving, in an electronic order cart, a selection of a plurality of items from the user (e.g. user 350 or 351 (FIG. 3)).

In various embodiments, method 600 can further comprise an activity 620 of, after receiving the selection of the plurality of items from the user, determining that at least one item of the plurality of items is not available in a store inventory of the store. The non-availability can be temporary or permanent because different stores might carry different inventory. In many embodiments, activity 620 of after receiving the selection of the plurality of items from the user, determining that the plurality of items are available in a store inventory of the store can comprise can comprise the order system (e.g., order system 310 (FIG. 3)) communicating with the inventory system (e.g., inventory system 320 (FIG. 3)) to verify availability of all or a portion of the plurality of items during a same network verification roundtrip and determining that one or more of the plurality of items is not available in the store inventory of the store. In many embodiments, the portion of the plurality of items comprises at least 10 percent, 20 percent, 30 percent, 40, percent, or 50 percent of the number of items of the plurality of items. In many embodiments, activity 520 of after receiving the selection of the plurality of items from the user, determining that the plurality of items are available in a store inventory of the store does not comprise the order system (e.g., order system 310 (FIG. 3)) communicating with the inventory system (e.g., inventory system 320 (FIG. 3)) to verify availability of only one item of the plurality of items during a single network verification roundtrip.

In some embodiments, method 600 can further comprise an activity 625 of determining one or more substitute items for the at least one item of the plurality of items not available in the store inventory of the store. In various embodiments, activity 625 of determining one or more substitute items for the at least one item of the plurality of items not available in the store inventory of the store can comprise the user (e.g. user 350 or 351 (FIG. 3)) indicating in a user profile of the user (e.g. user 350 or 351 (FIG. 3)) that substitutions are allowed. In some embodiments, activity 625 of determining one or more substitute items for the at least one item of the plurality of items not available in the store inventory of the store can comprise providing the user (e.g. user 350 or 351 (FIG. 3)) with one or more optional substitution items from which to select after indicating to the user (e.g. user 350 or 351 (FIG. 3)) that the at least one item of the plurality of items is not available in the store inventory of the store. In other embodiments, activity 625 comprises automatically making the substitution without confirming with the user, and instead, merely notifying the user of the substitution, particularly where the user profile indicates that substitutions are allowed. For example, if the user selects a 2 quart container of raspberries and if the store does not have any more 2 quart contains or raspberries, but does have 1 quart containers of raspberries, then the substitution of two 1 quart containers of raspberries can be made. As another example, if the user selects a 5 pound bag of russet potatoes and if the store does not have any more 5 pound bag of russet potatoes, but does have 2 pound bags of yukon potatoes, then the substitution of two 2 pound bags of yukon potatoes can be made. In the second example, the products and/or size of the products do not have to match exactly the user's original selection.

In a number of embodiments, method 600 can further comprise an activity 630 of, in response to determining the one or more substitute items for the at least one item of the plurality of items not available in the store inventory of the store, determining that one or more pickers are available to finish picking the plurality of items before the first time slot with the one or more substitute items exchanged for the at least one item. In many embodiments, activity 630 of, in response to determining the one or more substitute items for the at least one item of the plurality of items not available in the store inventory of the store, determining that one or more pickers are available to finish picking the plurality of items before the first time slot with the one or more substitute items exchanged for the at least one item can be similar to activity 525 (FIG. 5) of, in response to determining that the plurality of items are available in the store inventory, determining that one or more pickers are available to finish picking the plurality of items before the first time slot.

In various embodiments, method 600 can further comprise an activity 635 of after determining that the one or more pickers are available to pick the plurality of items with the one or more substitute items exchanged for the at least one item, confirming the first time slot with the user. In many embodiments, activity 635 of after determining that the one or more pickers are available to pick the plurality of items with the one or more substitute items exchanged for the at least one item, confirming the first time slot with the user can be similar to activity 530 (FIG. 5) of, after determining that the one or more pickers are available to pick the plurality of items, confirming the first time slot with the user.

In some embodiments, method 600 can further comprise an activity of assigning at least a portion of the plurality of items to a first picker of the one or more pickers. In a number of embodiments, method 500 can further comprise an activity of assigning a remainder of the plurality of items to a second picker of the one or more items. The other variations described above for method 500 (FIG. 5) can also apply here to method 600.

Returning to FIG. 4, FIG. 4 illustrates a block diagram of a portion of system 300 comprising order system 310, inventory system 320, and/or display system 360, according to the embodiment shown in FIG. 3. each of order system 310, inventory system 320, and/or display system 360 are merely exemplary and are not limited to the embodiments presented herein. Each of order system 310, inventory system 320, and/or display system 360 can be employed in many different embodiments or examples not specifically depicted or described herein. In some embodiments, certain elements or modules of order system 310, inventory system 320, and/or display system 360 can perform various procedures, processes, and/or acts. In other embodiments, the procedures, processes, and/or acts can be performed by other suitable elements or modules.

In many embodiments, order system 310 can comprise non-transitory memory storage modules 412 and 414, inventory system 320 can comprise non-transitory memory storage modules 422 and 424, and display module can comprise a non-transitory memory storage module 462. Memory storage module 412 can be referred to as a time slot module 412, and memory storage module 414 can be referred to as a selection module 514. Memory storage module 422 can be referred to as a sourcing module 422, and memory storage module 424 can be referred to as a picker module 424. Memory storage module 462 can be referred to as a display module 462.

In many embodiments, time slot module 412 can store computing instructions configured to run on one or more processing modules and perform one or more acts of methods 500 (FIG. 5) (e.g., activity 530 of after determining that the one or more pickers are available to pick the plurality of items, confirming the first time slot with the user (FIG. 5)) or one or more acts of method 600 (FIG. 6) (e.g., activity 635 of after determining that the one or more pickers are available to pick the plurality of items with the one or more substitute items exchanged for the at least one item, confirming the first time slot with the user (FIG. 6)). In some embodiments, selection module 414 can store computing instructions configured to run on one or more processing modules and perform one or more acts of method 500 (FIG. 5) (e.g., activity 510 of receiving a selection over an electronic transmission system of a first time slot from the user (e.g. user 350 or 351 (FIG. 3)), the one or more available time slots comprising the first time slot (FIG. 5) and/or activity 515 of receiving, in an electronic order cart, a selection of a plurality of items from the user (FIG. 5)) or one or more acts of method 600 (FIG. 6) (e.g., activity 610 of receiving a selection over an electronic transmission system of a first time slot from the user, the one or more available time slots comprising the first time slot (FIG. 6) and/or activity 615 of receiving, in an electronic order cart, a selection of a plurality of items from the user (FIG. 6)).

In many embodiments, sourcing module 422 can store computing instructions configured to run on one or more processing modules and perform one or more acts of method 500 (FIG. 5) (e.g., activity 520 of after receiving the selection of the plurality of items from the user, determining that the plurality of items are available in a store inventory of the store (FIG. 5)) or one or more acts of method 600 (e.g., activity 620 of after receiving the selection of the plurality of items from the user, determining that at least one item of the plurality of items is not available in a store inventory of the store (FIG. 6)).

In some embodiments, picker module 424 can store computing instructions configured to run on one or more processing modules and perform one or more acts of method 500 (FIG. 5) (e.g., activity 525 of in response to determining that the plurality of items are available in the store inventory, determining that one or more pickers are available to finish picking the plurality of items before the first time slot (FIG. 5)) or one or more acts of method 600 (FIG. 6) (e.g., activity 625 of In response to determining that the plurality of items are available in the store inventory, determining that one or more pickers are available to finish picking the plurality of items before the first time slot (FIG. 6) and/or activity 630 of in response to determining the one or more substitute items for the at least one item of the plurality of items not available in the store inventory of the store, determining that one or more pickers are available to finish picking the plurality of items before the first time slot with the one or more substitute items exchanged for the at least one item (FIG. 6)). In some embodiments, display module 462 can store computing instructions configured to run on one or more processing modules and perform one or more acts of method 500 (FIG. 5) (e.g., activity 505 of facilitating display on an electronic display of one or more available time slots available at a store to a user (FIG. 5)) or one or more acts of method 600 (FIG. 6) (e.g., activity 605 of facilitating display on an electronic display of one or more available time slots available at a store to a user (FIG. 6)).

Although systems and methods for search result comparison been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the activities of FIGS. 3-6 may include different activities and/or be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
- one or more processors; and
- one or more non-transitory computer-readable media storing computing instructions configured to run on the one or more processors and perform:
  - prior to receiving an electronic order cart from a user, an inventory system sleeps in an offline state;
  - receiving, in the electronic order cart, a first selection of a plurality of items from the user;
  - responsive to receiving the electronic order cart from the user, facilitating a display on an electronic display of one or more available time slots available at a store to the user;
  - receiving a second selection over an electronic transmission system of a first time slot from the user, the one or more available time slots comprising the first time slot;
  - confirming the first time slot with the user;
  - after receiving the first selection of the plurality of items from the user, determining an availability of the plurality of items in a store inventory of the store using the inventory system in an online state;
  - determining that one or more items of the plurality of items in the electronic order cart from the user are unavailable in the store inventory of the store;
  - displaying on the electronic display one or more earlier time slots available at the store to the user based on:
    - removing the one or more items of the plurality of items that are unavailable from the electronic order cart; and
    - determining that one or more pickers are available to finish picking the plurality of items remaining in the electronic order cart before each of the one or more earlier time slots, the one or more earlier time slots occurring before the first time slot;
  - receiving an additional selection over the electronic transmission system of an earlier time slot of the one or more earlier time slots from the user; and
  - after determining that the one or more pickers are available to pick the plurality of items remaining in the electronic order cart before the earlier time slot, confirming the earlier time slot with the user.

2. The system of claim 1, wherein:
- facilitating the display on the electronic display of the one or more available time slots further comprises facilitating the display on the electronic display of a calendar with one or more open time slots for at least two days.

3. The system of claim 1, wherein:
- an earliest time slot of the one or more available time slots is at least 30 minutes after the one or more available time slots are displayed to the user.

4. The system of claim 1, wherein:
- receiving the first selection of the plurality of items from the user further comprises prefilling the electronic order cart with a previous order of the user.

5. The system of claim 1, wherein:
- confirming the first time slot with the user further comprises confirming the first time slot with the user through one or more channels.

6. The system of claim 1, wherein:
- the store comprises a closest store to a location of the user.

7. The system of claim 1, wherein the computing instructions are further configured to perform:
- assigning a portion of the plurality of items to a first picker of the one or more pickers; and
- assigning a remainder of the plurality of items to a second picker of the one or more pickers.

8. A method comprising:
- prior to receiving an electronic order cart from a user, an inventory system sleeps in an offline state;
- receiving, in the electronic order cart, a first selection of a plurality of items from the user;
- responsive to receiving the electronic order cart from the user, facilitating a display on an electronic display of one or more available time slots available at a store to the user;
- receiving a second selection over an electronic transmission system of a first time slot from the user, the one or more available time slots comprising the first time slot;
- confirming the first time slot with the user;
- after receiving the first selection of the plurality of items from the user, determining an availability of the plurality of items in a store inventory of the store using the inventory system in an online state;
- determining that one or more items of the plurality of items in the electronic order cart from the user are unavailable in the store inventory of the store;

displaying on the electronic display one or more earlier time slots available at the store to the user based on:

removing the one or more items of the plurality of items that are unavailable from the electronic order cart; and determining that one or more pickers are available to finish picking the plurality of items remaining in the electronic order cart before each of the one or more earlier time slots, the one or more earlier time slots occurring before the first time slot;

receiving an additional selection over the electronic transmission system of an earlier time slot of the one or more earlier time slots from the user; and after determining that the one or more pickers are available to pick the plurality of items remaining in the electronic order cart before the earlier time slot, confirming the earlier time slot with the user.

9. The method of claim 8, wherein:

facilitating the display on the electronic display of the one or more available time slots further comprises facilitating the display on the electronic display of a calendar with one or more open time slots for at least two days.

10. The method of claim 8, wherein:

an earliest time slot of the one or more available time slots is at least 30 minutes after the one or more available time slots are displayed to the user.

11. The method of claim 8, wherein:

receiving the first selection of the plurality of items from the user further comprises prefilling the electronic order cart with a previous order of the user.

12. The method of claim 8, wherein:

confirming the first time slot with the user further comprises confirming the first time slot with the user through one or more channels.

13. The method of claim 8, wherein:

the store comprises a closest store to a location of the user.

14. The method of claim 8, further comprising:

assigning a portion of the plurality of items to a first picker of the one or more pickers; and assigning a remainder of the plurality of items to a second picker of the one or more pickers.

15. A method comprising:

prior to receiving an electronic order cart from a user, an inventory system sleeps in an offline state;

receiving, in the electronic order cart, a first selection of a plurality of items from the user;

responsive to receiving the electronic order cart from the user, facilitating a display on an electronic display of one or more available time slots available at a store to the user;

receiving a second selection over an electronic transmission system of a first time slot from the user, the one or more available time slots comprising the first time slot;

confirming the first time slot with the user;

after receiving the first selection of the plurality of items from the user, determining that at least one item of the plurality of items is not available in a store inventory of the store using the inventory system in an online state;

determining one or more substitute items for the at least one item of the plurality of items not available in the store inventory of the store;

determining that one or more pickers are available to finish picking the plurality of items before the first time slot with the one or more substitute items exchanged for the at least one item; and after determining that the one or more pickers are available to pick the plurality of items with the one or more substitute items exchanged for the at least one item, displaying on the electronic display one or more earlier time slots available at the store to the user based on:

exchanging the one or more substitute items for the at least one item of the plurality of items that are unavailable from the electronic order cart; and determining that the one or more pickers are available to finish picking the plurality of items with the one or more substitute items exchanged for the at least one item in the electronic order cart before each of the one or more earlier time slots, the one or more earlier time slots occurring before the first time slot;

receiving an additional selection over the electronic transmission system of an earlier time slot of the one or more earlier time slots from the user; and after determining that the one or more pickers are available to pick the plurality of items remaining and the one or more substitute items in the electronic order cart, before the earlier time slot, confirming the earlier time slot with the user.

16. The method of claim 15, wherein:

facilitating the display on the electronic display of the one or more available time slots further comprises facilitating the display on the electronic display of a calendar with one or more open time slots for at least two days.

17. The method of claim 15, wherein:

an earliest time slot of the one or more available time slots is at least 30 minutes after the one or more available time slots are displayed to the user.

18. The method of claim 15, wherein:

receiving the first selection of the plurality of items from the user further comprises prefilling the electronic order cart with a previous order of the user.

19. The method of claim 15, wherein:

confirming the first time slot with the user further comprises confirming the first time slot with the user through one or more channels.

20. The method of claim 15, further comprising:

assigning a portion of the plurality of items to a first picker of the one or more pickers; and assigning a remainder of the plurality of items to a second picker of the one or more pickers.

* * * * *